United States Patent [19]

Manning

[11] Patent Number: 5,519,790
[45] Date of Patent: May 21, 1996

[54] METHOD FOR REDUCING NOISE IN DIGITAL VIDEO INFORMATION

[75] Inventor: Michael J. Manning, Des Plaines, Ill.

[73] Assignee: Viacom International, New York, N.Y.

[21] Appl. No.: 342,689

[22] Filed: Nov. 21, 1994

Related U.S. Application Data

[63] Continuation of Ser. No. 990,426, Dec. 15, 1992, abandoned.

[51] Int. Cl.$^6$ ..................................................... G06K 9/36
[52] U.S. Cl. ............................ 382/236; 348/415; 382/275
[58] Field of Search ..................................... 382/236, 103, 382/107, 275, 278, 279; 348/169, 143, 420, 415, 416

[56] References Cited

U.S. PATENT DOCUMENTS

| | | | |
|---|---|---|---|
| 3,553,361 | 1/1971 | Mounts | 178/7.1 |
| 3,580,999 | 5/1971 | Mounts | 178/7.1 |
| 3,584,145 | 6/1971 | Cutler | 178/7.1 |
| 3,603,725 | 9/1971 | Cutler | 178/6 |
| 3,720,786 | 3/1973 | Cutler | 178/7.1 |
| 4,494,140 | 1/1985 | Michael | 358/105 |

Primary Examiner—Joseph Mancuso
Attorney, Agent, or Firm—Pennie & Edmonds

[57] ABSTRACT

A method for reducing noise in digital video information is provided which includes the use of key frames, whereby pixel values for a key frame replace the corresponding pixel values for corresponding pixels of all subsequent frames prior to another key frame, as long as the pixel values being replaced do not differ from the key frame values by more than a predetermined threshold. A key frame, once established, is compared to a next frame to determine whether the next frame should be designated another key frame. The next frame should be designated another key frame when more than a predetermined portion of the pixels of the next frame differ from corresponding pixels of the original key frame by more than a predetermined threshold. The method proceeds recursively until all pixels of all frames are resolved by having their values replaced by key frame values. The method may include data compression as an integral part thereof.

11 Claims, 6 Drawing Sheets

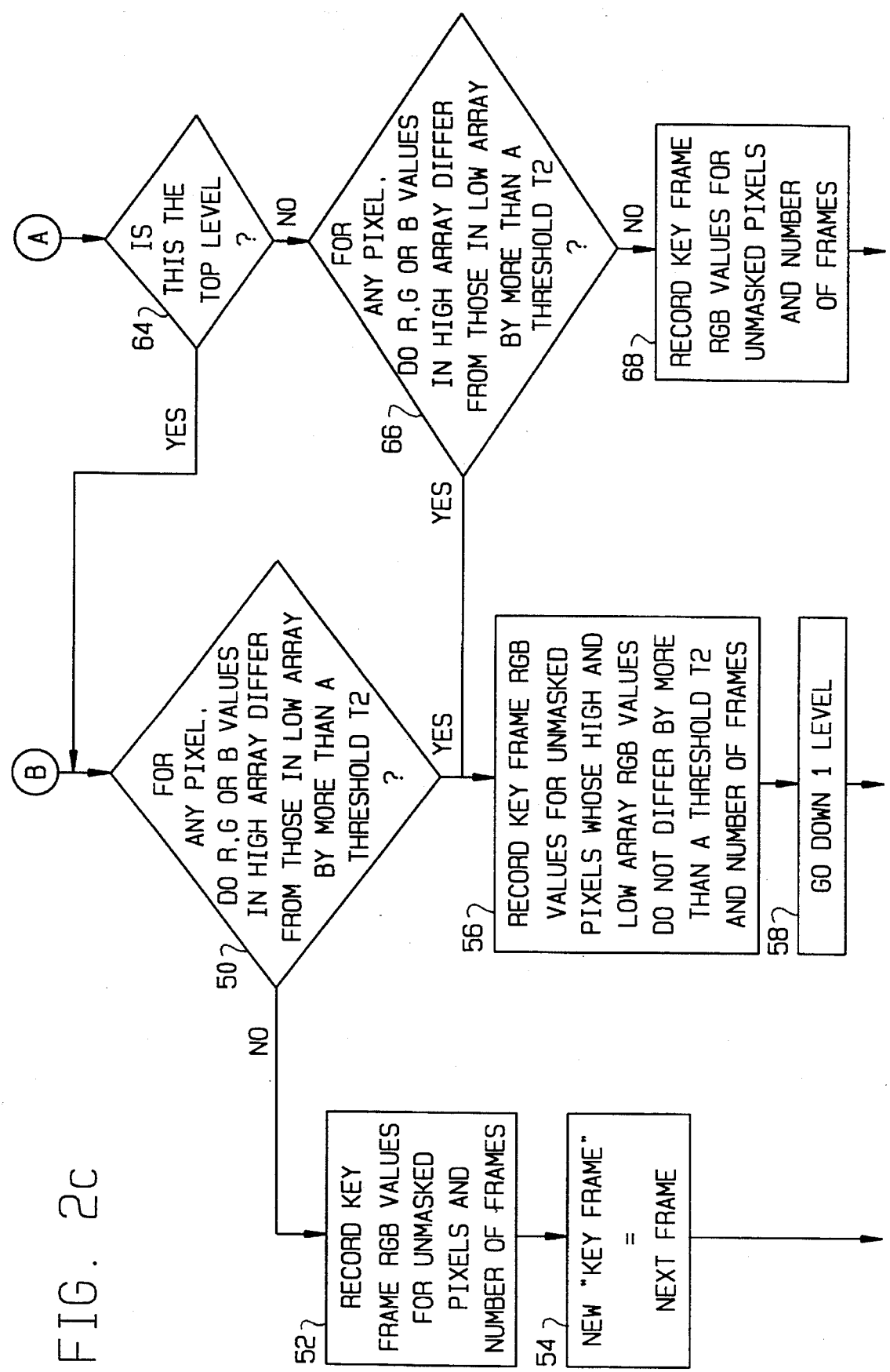

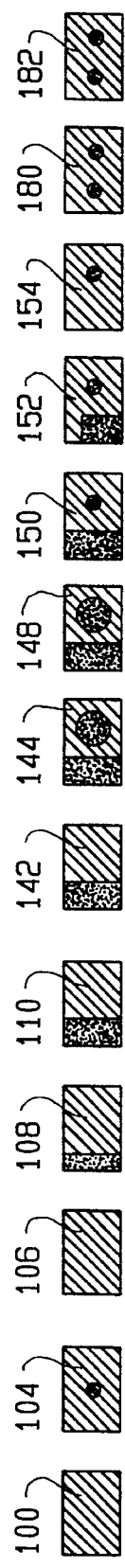
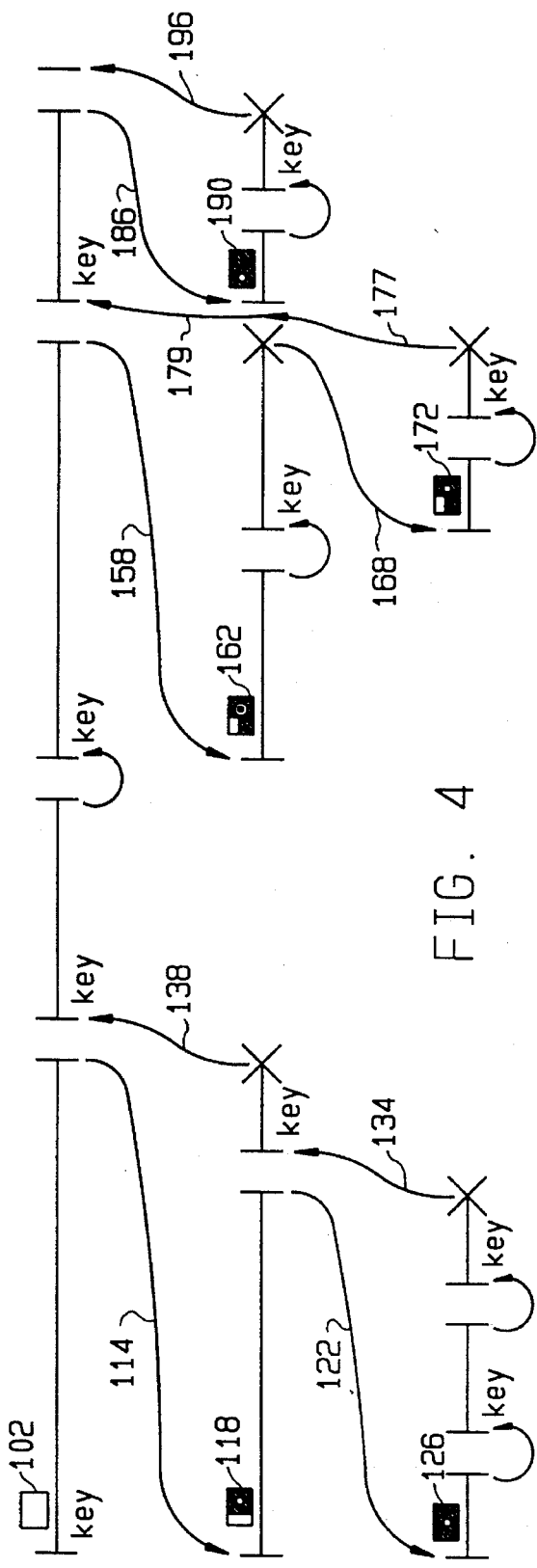
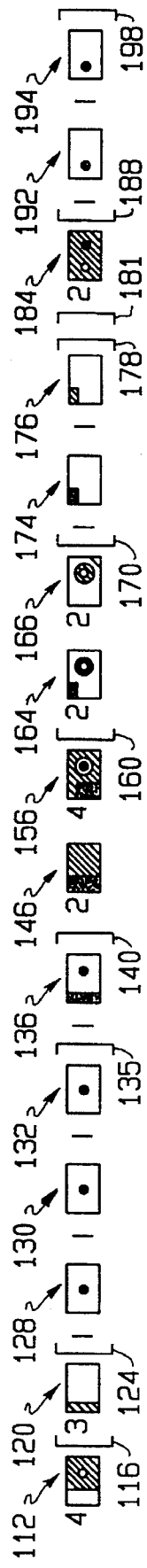
FIG. 3
FIG. 4
FIG. 5

METHOD FOR REDUCING NOISE IN DIGITAL VIDEO INFORMATION

This is a continuation of application Ser. No. 07/990,426, filed Dec. 15, 1992, now abandoned.

FIELD OF THE INVENTION

The present invention relates generally to displaying video signals. More particularly, the present invention provides a method for reducing noise in video information in connection with the display of video signals which have been stored, retrieved or otherwise processed in a digital form.

BACKGROUND OF THE INVENTION

Video information may be characterized as information representing a succession of frames, with each frame representing a "still" picture which, in turn, is composed of individual picture elements, or pixels. When video information is received by a suitable display device, the frames are displayed in succession, giving an observer the illusion of motion. Common television monitors, for example, receive such video information for display.

Traditionally, video information has been transmitted, received and processed for display in an analog form. However, with the evolution of powerful digital computers having memories and storage devices, such as disks and the like, capable of storing large quantities of digital information, it has become desirable to store video information in a digital form. Typically, when analog video information is converted to a digital form, it is done in such a way that each pixel of each frame is analyzed, and a digital value is created representing the intensity of each such pixel. In the case of color video information, a separate digital value is created representing the intensity of each separate color component of the pixel. For example, each pixel of color video information may be represented by three 8-bit bytes, with one byte (8 bits) representing the intensity of the red component of the pixel, a second byte representing the intensity of the green component of the pixel and a third byte representing the intensity of the blue component of the pixel.

Video information in such a digital form has been stored or otherwise processed successfully. However, because high resolution, full motion, video information often has on the order of tens of thousands of pixels per frame and a frame rate on the order of ten to thirty or more frames per second, storing such video information as described above requires an inordinate amount of digital storage capacity. To reduce the required storage capacity, various methods of compressing the digital information have been attempted. For example, rather than storing full pixel information for each pixel of each frame, only information for those pixels that have changed from the previous frame is stored. Upon retrieving such compressed information, it must be processed (or decompressed) before it can be displayed.

While such a compression technique tends to reduce the required storage capacity, it is most effective where the video information to be displayed is computer generated. For example, the pixels comprising the "blue sky" appearing in the background of a scene which lasts for many frames can be made the same shade of blue for all relevant frames when the information is computer generated. As such, there would be no change at all from frame to frame for those pixels, thereby permitting a high degree of compression.

Where, on the other hand, the scene is filmed live or recorded live on videotape, and then digitized, compression is much less effective, because of noise or color drift introduced by the camera or the analog recording media or the digitization equipment. Where noise or color drift occurs from one pixel of one frame to a corresponding pixel of the next frame, that then becomes a pixel that cannot be compressed. Of course, the resolution of the digital information can be sacrificed in order to increase compression, but that results in a corresponding degradation of the quality of the video display.

SUMMARY OF THE INVENTION

Accordingly, a method for reducing video noise has been provided, resulting in improved compressibility.

The method includes the use of key frames, whereby, in the case of color video information, the red, green and blue pixel values for a key frame replace the corresponding pixel values for corresponding pixels of all subsequent frames prior to another key frame, as long as the pixel values being replaced do not differ from the key frame values by more than a predetermined threshold.

The method may include compression as well.

In accordance with one embodiment of the invention, a key frame is established, and the next frame is compared to the key frame to determine whether the next frame is another key frame. The next frame is another key frame when more than a predetermined portion of the pixels of the next frame differ from corresponding pixels of the original key frame by more than a predetermined threshold. If that next frame is not another key frame, then the above-described comparison is made between the key frame and the next subsequent frame. Once another key frame is reached, a determination is made as to which, if any, pixels of the first key frame should provide values to replace the values of corresponding pixels in the frames between the key frames. The pixel values for a key frame pixel should replace the values for corresponding pixels of subsequent frames when each one of the corresponding pixels of those frames differs from the key frame pixel by no more than a predetermined threshold. For those pixels whose values were not replaced, the above-described method is again employed from the first key frame, but only those pixels whose values were not replaced are considered in determining whether a new key frame is reached. The thresholds may be altered at this point, as may be the required portion of different pixels for a determination that a new key frame has been reached. The method continues in this fashion until key frame pixel values are substituted for all pixel values. The substitution of key frame pixel values accomplished by this method lends itself to immediate compression based upon those key frame values. As such, compression may readily be made a part of the method of noise reduction of the present invention.

BRIEF DESCRIPTION OF THE DRAWINGS

FIG. 3 is a diagram illustrating a sequence of frames useful in describing one embodiment of the present invention.

FIG. 4 is a schematic diagram illustrating the key frames of FIG. 3.

FIG. 5 is a schematic diagram showing, with respect to FIGS. 3 and 4, one type of compression which is compatible with the present invention.

DETAILED DESCRIPTION OF THE ILLUSTRATED EMBODIMENT

Figure 1:
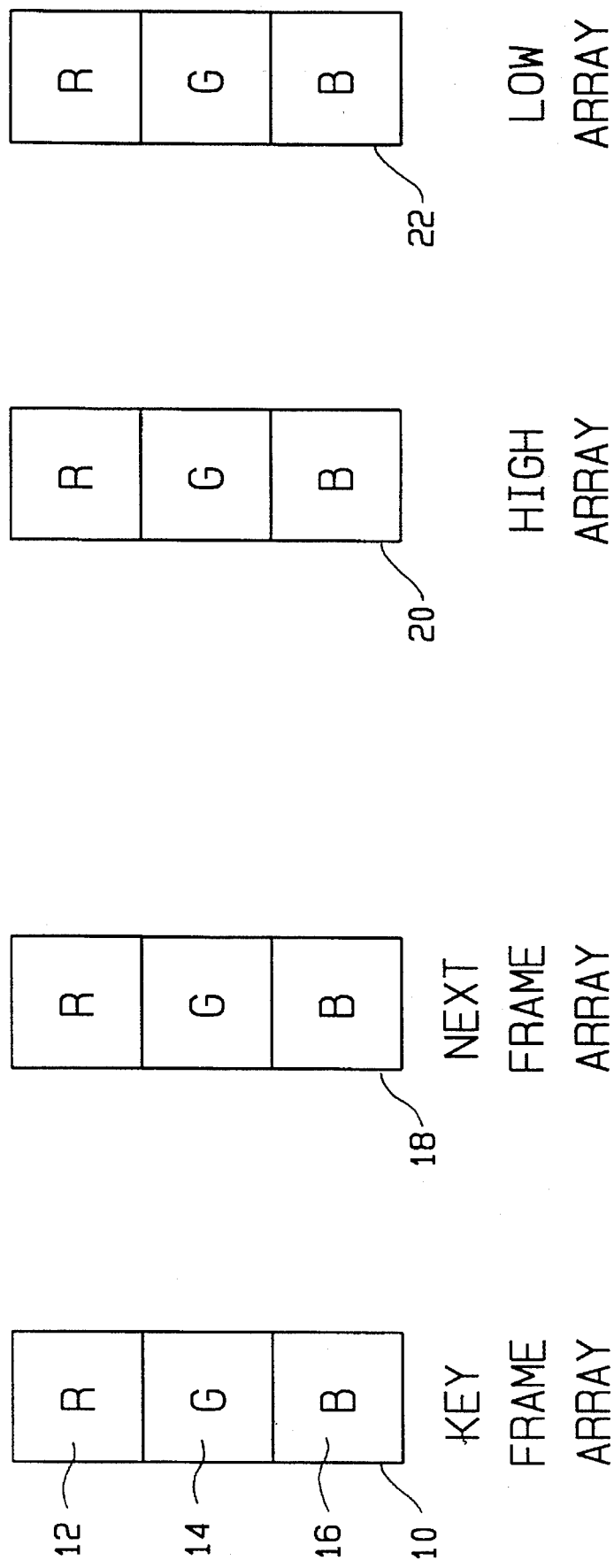
FIG. 1 is a schematic illustration of data structures used in performing one embodiment of the method of the present invention.

Referring now to the drawings, FIG. 1 illustrates certain data structures used in performing one embodiment of the method of the present invention. Key frame array 10 includes values for the red, green and blue components of each pixel of a key frame. Conceptually, key frame array 10 has a red portion 12 which includes pixel values for the red component of each pixel of the key frame. Similarly, key frame array 10 has a green portion 14 and a blue portion 16 containing green and blue pixel values, respectively, for each pixel of the key frame. A next frame array 18, a high array 20 and a low array 22 are also provided, each having red, green and blue ("RGB") portions. The manner in which these data structures are used will become apparent in connection with the description below.

Figure 2A:
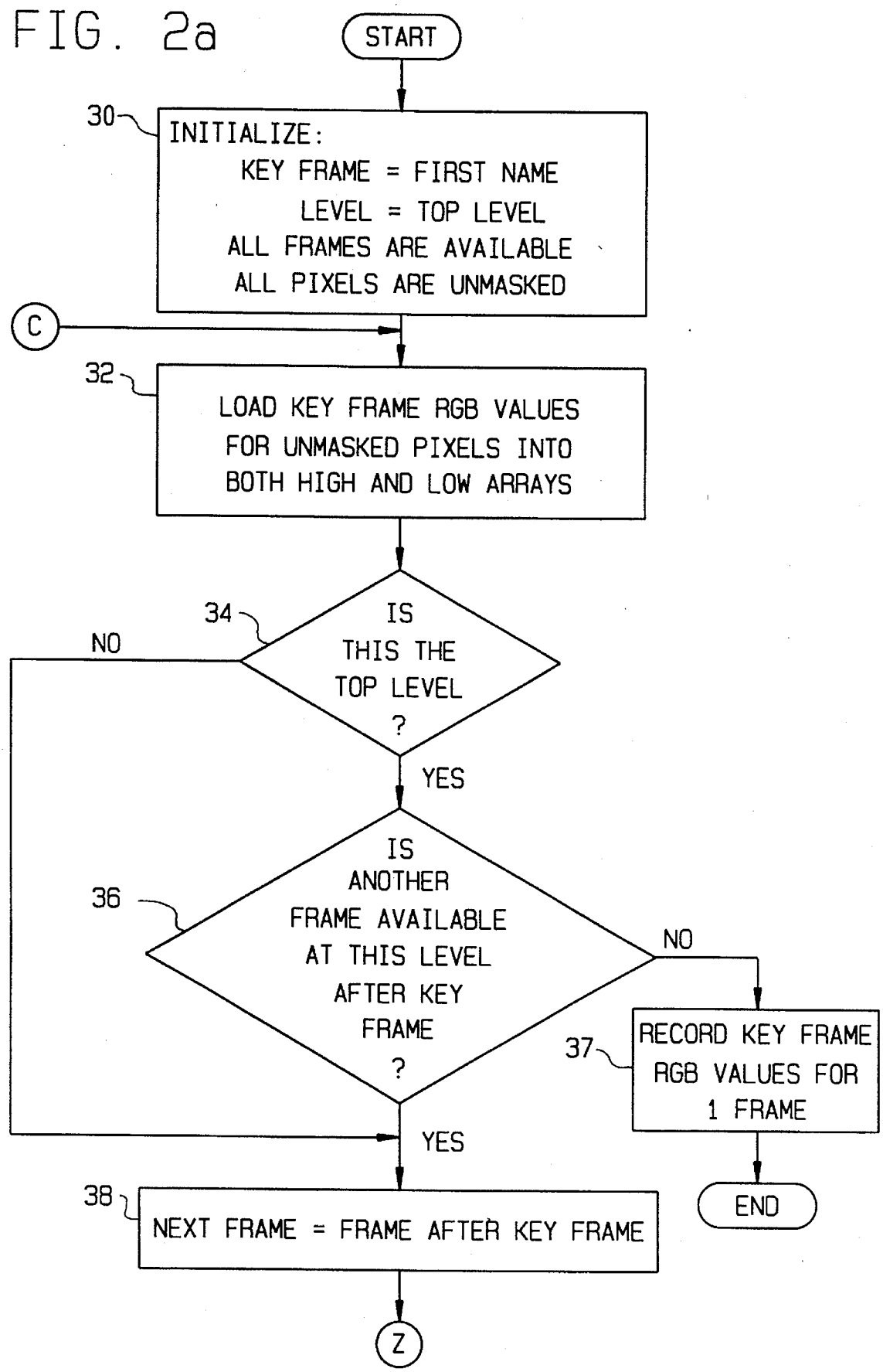
FIGS. 2A–C are flow charts illustrating steps performed in carrying out one embodiment of the method of the present invention.
Figure 2B:
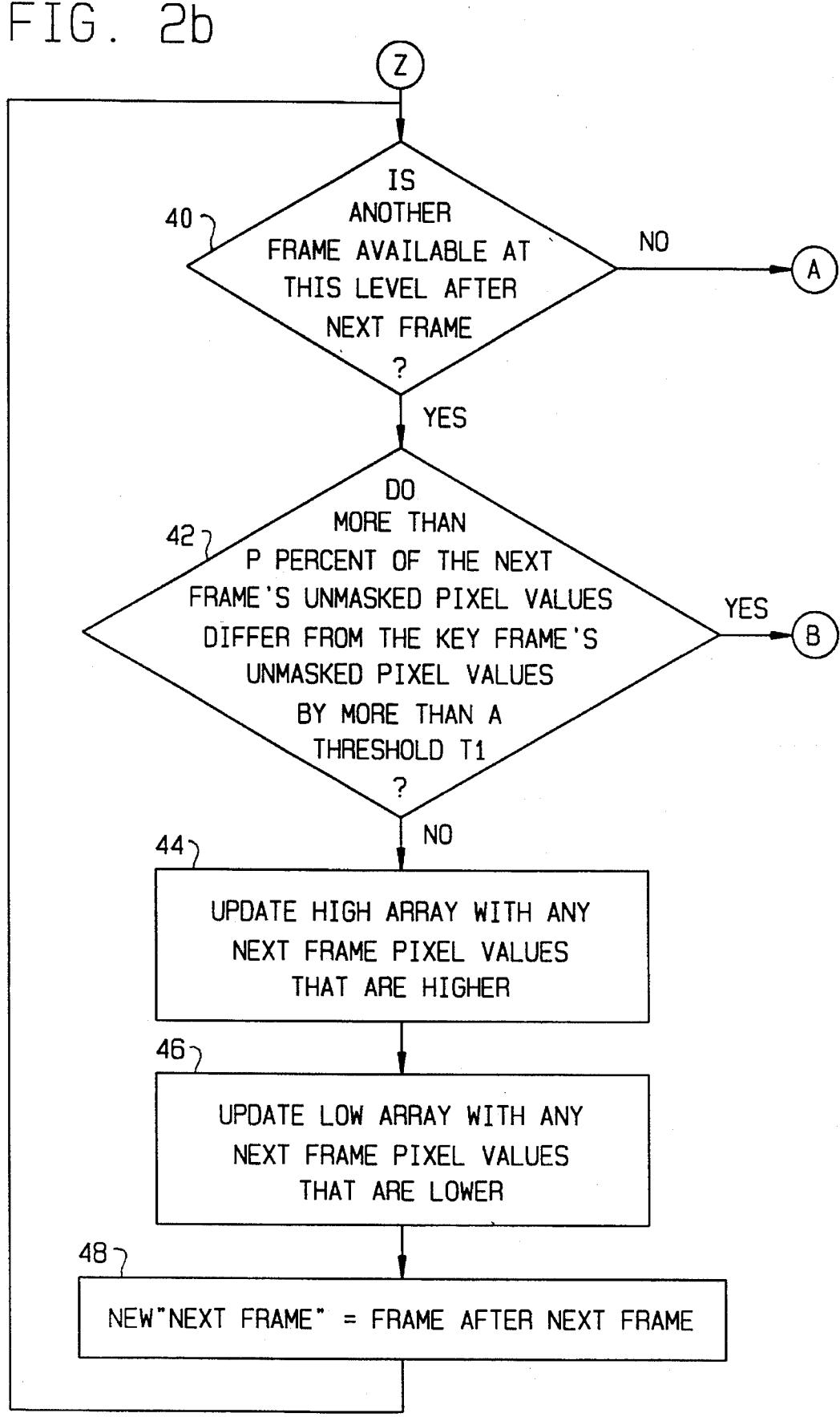
Figure 2D:
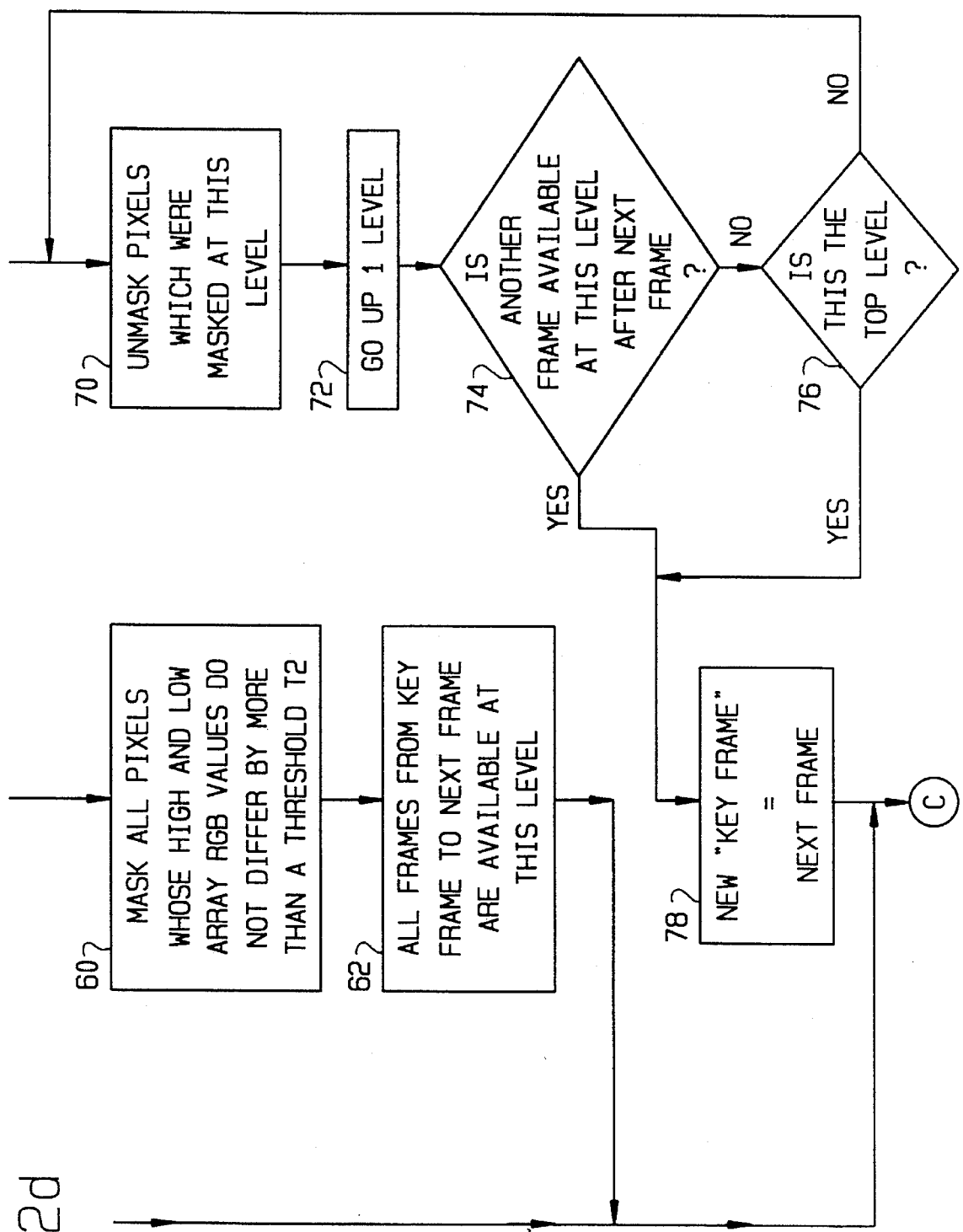

Turning now to FIG. 2, a flow chart illustrating the steps performed in carrying out one embodiment of the method of the present invention is provided. The method of the present invention can be carried out manually but is preferably carried out by a programmable computer. Also, it should be noted that the embodiment illustrated in FIG. 2 includes compression as well as noise reduction. At the start of the illustrated method, the steps shown at block 30 are performed. At block 30, the KEY FRAME is established as being the first frame of the sequence of frames of the video information. Also, at this point, the LEVEL is set to be the top level. The significance of the LEVEL at any point will become apparent as the description proceeds. Further, at block 30, all frames are designated as being AVAILABLE, and all pixels are designated as being UNMASKED. Again, the significance of AVAILABLE frames and UNMASKED pixels will become apparent as the description proceeds.

Flow proceeds from block 30 to block 32 whereat the KEY FRAME RGB values for UNMASKED pixels are loaded into both high array 20 and low array 22. From block 32, flow proceeds to decision block 34 where a decision is made as to whether the LEVEL is the top level. If from decision block 34 it is determined that the current LEVEL is the top level, then flow proceeds from decision block 34 to decision block 36.

At decision block 36, a determination is made as to whether another frame is AVAILABLE at this LEVEL after the KEY FRAME. If from decision block 36 it is determined that another frame is AVAILABLE at this LEVEL after the KEY FRAME, then flow proceeds from decision block 36 to block 38. Returning for a moment to decision block 34, if at that block it is determined that the current LEVEL is not the top level, then flow proceeds directly from decision block 34 to block 38.

At block 38, the NEXT FRAME is set to be the frame after the KEY FRAME. From block 38, flow proceeds to decision block 40. At decision block 40, a determination is made as to whether another frame is AVAILABLE at this LEVEL after the NEXT FRAME. If, at decision block 40, the determination is made that another frame is AVAILABLE at this LEVEL after the NEXT FRAME, then flow proceeds to decision block 42. At decision block 42, a determination is made as to whether more than P percent of the NEXT FRAME's unmasked pixel values differ from the KEY FRAME's unmasked pixel values by more than a threshold T1. The determination made at decision block 42 is essentially the determination as to whether the NEXT FRAME should be designated as a new key frame. There are numerous ways in which the difference between the pixel values of the KEY FRAME and the NEXT FRAME may be determined. For example, the difference may be the sum of the differences between the red, green and blue components of the respective pixels. Alternatively, the difference may simply be the greatest of the differences between the respective red, green and blue components. However, it has been found to be preferable to measure the difference in three-dimensional RGB space. In other words, the pythagorean distance formula can be used to measure the difference. As such, the differences between the respective red, green and blue components would be squared and then summed to provide a representation of the distance.

If, at decision block 42, it is determined that the NEXT FRAME should not be made a new key frame, then the flow would proceed from decision block 42 to block 44. At block 44, the high array 20 is updated with any NEXT FRAME pixel values that are higher than the values of corresponding pixels already in the array. In other words, on a pixel-by-pixel basis, for unmasked pixels, a comparison is made between the NEXT FRAME RGB values, found in the next frame array 18, and the RGB values already in the high array 20. For each NEXT FRAME red, green or blue pixel value that is higher than the corresponding value in the high array 20, that value in the high array 20 is replaced by the corresponding value from the next frame array 18.

From block 44 flow proceeds to block 46 whereat the low array 22 is updated with any NEXT FRAME pixel values that are lower than the corresponding values already in the low array 22. In other words, on a pixel-by-pixel basis for unmasked pixels, a comparison is made between NEXT FRAME red, green and blue values and the values already present in the low array 22. For each NEXT FRAME red, green or blue pixel value that is lower than the corresponding value in the low array 22, the value in the low array 22 is replaced by the corresponding value in the next frame array 18.

From block 46 flow proceeds to block 48 whereat a new NEXT FRAME is established as being the frame after the old NEXT FRAME. From block 48 flow proceeds back to decision block 40.

Returning again to decision block 42, if it is determined that the NEXT FRAME should be a new key frame, then flow proceeds from decision block 42 to decision block 50. At decision block 50, a determination is made as to whether, for any pixel, the red, green or blue values in the high array 20 differ from those in the low array 22 by more than a threshold T2. If, at decision block 50, it is determined that for no pixel do the red, green or blue values in the high array 20 differ from those in the low array 22 by more than a threshold T2, then flow proceeds from decision block 50 to block 52. At block 52, a record is made of the KEY FRAME's red, green and blue values for unmasked pixels and of the number of frames for which those values apply. That number is the number of frames from (and including) the KEY FRAME and all frames up to, but not including, the NEXT FRAME. From block 52, flow proceeds to block 54, whereat what has been the NEXT FRAME is made the new KEY FRAME. From block 54 flow proceeds back to block 32 described above.

Returning again to decision block 50, if, for one or more pixels, the red, green or blue values in the high array 20 differ from those in the low array 22 by more than a threshold T2, then flow proceeds from decision block 50 to block 56. At block 56, a record is made of the KEY FRAME's red, green and blue values for unmasked pixels whose corresponding high array and low array values do not differ by more than a threshold T2. Also, at block 56, a record is made of the number of frames for which those values apply. From block 56 flow proceeds to block 58, at which the LEVEL is set to go down one level. Next, at block 60, all pixels whose corresponding high array and low array red, green and blue values do not differ by more than a threshold T2 are MASKED. From block 60, flow proceeds to block 62, whereat all frames from the KEY FRAME to the NEXT FRAME are designated as being AVAILABLE at this LEVEL. From block 62, flow proceeds back to block 32 described above.

Returning again to decision block 40, if it is determined that another frame is not AVAILABLE at this LEVEL after the NEXT FRAME, then flow proceeds from decision block 40 to decision block 64. At decision block 64, a determination is made as to whether the current LEVEL is the top level. If so, flow proceeds from decision block 64 to decision block 50 described above. If, at decision block 64, it is determined that the current LEVEL is not the top level, then flow proceeds from decision block 64 to decision block 66. At decision block 66, the same determination is made as was made at decision block 50 described above. If, at decision block 66, it is determined that for one or more pixels, the red, green or blue values in the high array differ from those in the low array by more than a threshold T2, then flow proceeds from decision block 66 to block 56 described above. If, on the other hand, at decision block 66, it is determined that for no pixel do the red, green or blue values in the high array differ from those in the low array by more than a threshold T2, then flow proceeds from decision block 66 to block 68.

At block 68, a record is made of the KEY FRAME red, green and blue values for unmasked pixels and the number of frames for which those values apply. From block 68, flow proceeds to block 70, whereat the pixels which were masked at this LEVEL are unmasked. From block 70 flow proceeds to block 72, at which the LEVEL is set to go up one level. From block 72 flow proceeds to block 74 where a determination is made as to whether another frame is AVAILABLE at this LEVEL after the NEXT FRAME. If, at decision block 74, it is determined that no other frames are AVAILABLE at this LEVEL after the NEXT FRAME, then flow proceeds from decision block 74 to decision block 76. At decision block 76, a determination is made as to whether the current LEVEL is the top level. If not, then flow proceeds from decision block 76 back to block 70 described above. If, on the other hand, at decision block 76 it is determined that the current LEVEL is the top level, then flow proceeds from decision block 76 to block 78. Similarly, if, at block 74, it is determined that another frame is AVAILABLE at this LEVEL after the NEXT FRAME, then flow proceeds to block 78. At block 78, what has been the NEXT FRAME is designated as the new KEY FRAME. From block 78 flow proceeds back to block 32 described above.

Returning again to decision block 36, if it is determined that another frame is not AVAILABLE at this LEVEL (the top level), after the KEY FRAME, then flow proceeds from decision block 36 to block 37. At block 37 a record is made of the KEY FRAME's red, green and blue values for one frame, after which the flow of the illustrated embodiment comes to an end.

The percentage P and the threshold T1 referred to at decision block 42 may be adjusted from level to level if desired. A lower percentage P or a lower threshold T1 will result, in all probability, in a greater number of frames being made key frames. Conversely, a higher percentage P or a higher threshold T1 will likely result in fewer frames being made key frames. The threshold T2 referred to in decision blocks 50 and 66 may be varied from level to level if desired. The threshold T2 may be considered as a noise threshold. A higher threshold T2 will result in a greater level of noise reduction, but it may also result in the loss of subtle variations in the video information that are not the result of noise. Conversely, a lower threshold T2 will result in a lower level of noise reduction, but it will also tend to preserve subtle changes in the video information not resulting from noise. The appropriate percentage P and thresholds T1 and T2 depend upon the nature of the video information being processed and the degree of compression ultimately desired.

The flow of FIG. 2 can best be understood with reference to a sample sequence of changing frames of video information. FIG. 3 is a diagram illustrating such a sequence of frames. For clarity, the frames include only two colors: brown, represented by diagonal lines, and black, represented by the black portions. It should also be noted that for purposes of the following illustration, the difference between a brown pixel and a black pixel is sufficient to exceed threshold T2. In connection with the following description, reference should also be made to FIG. 4, which illustrates the key frames as well as the various levels reached as the flow proceeds. Finally, reference should also be made to FIG. 5 which illustrates, in schematic form the information recorded as the flow progresses. Of course, in practice, the information would be recorded digitally according to any suitable format as is well known in the art.

Frame 100 shown in FIG. 3 is entirely brown. Frame 100 is thus the first frame which becomes the KEY FRAME at block 30 of FIG. 2. Also at block 30 all pixels are unmasked, and this is represented by an empty rectangle 102 in FIG. 4. At block 32 the red, green and blue values for all pixels of frame 100 are loaded into both the high array 20 and the low array 22. Frame 104 is designated the NEXT FRAME at block 38 of FIG. 2. Frame 104 is a brown field with a small black dot at the center. Flow proceeds from block 38 through block 40 to block 42, at which point it is determined, in this example, that frame 104 should not be made a new KEY FRAME. As a result, flow proceeds from block 42 to block 44 and then block 46. Assuming for present purposes that the red, green and blue pixel values for black are lower than the respective pixel values for brown, the steps performed at blocks 44 and 46 result in no change to the high array but a change to the low array for the pixels comprising the small dot in the center of the frame. In other words, for the elements of the low array corresponding to the pixels of the small dot in the center of the frame, the values for black will replace the previously existing values for brown.

At block 48, the frame after what was the NEXT FRAME becomes the new NEXT FRAME. That frame is frame 106 shown in FIG. 3. Frame 106, like frame 100, is entirely brown. Flow proceeds through block 40 to block 42 where it is determined that block 106 should not be made a new KEY FRAME. Flow then proceeds through blocks 44 and 46. Because frame 106 is the same as frame 100, neither the high array nor the low array is changed in any way.

At block 48, the frame after what was the NEXT FRAME becomes the new NEXT FRAME. That frame is frame 108 shown in FIG. 3. Frame 108 has a thin, black vertical band along the left edge of the frame, with the remainder being brown. Flow proceeds through block 40 to block 42. Frame 108 should not be a new KEY FRAME because, in this example, less than P percent of frame 108's pixel values differ from frame 100's pixel values by more than a threshold T1. Therefore, flow proceeds from block 42 to block 44 where no change is made to the high array. Next, at block 46, the low array is adjusted so that the elements corresponding to the pixels of the black vertical band along the left edge of frame 108 are replaced with the values corresponding to the color black.

At block 48, the frame after what has been the NEXT FRAME becomes the new NEXT FRAME. That frame is frame 110 shown in FIG. 3. Frame 110 has a wide vertical black band along the left edge of the frame. Flow proceeds back around to block 42 where, in this instance, it is determined that frame 110 should be a new KEY FRAME. Accordingly, flow then proceeds from block 42 to block 50, where it is determined that, for several pixels, the red, green and blue values in the high array differ from those in the low array by more than a threshold T2. As a result, flow proceeds from block 50 to block 56 where a record is made of frame 100's red, green and blue values for each pixel other than those corresponding to the small dot in the middle of frame 104 and the thin, vertical band along the left edge of frame 108. Also, at block 56 a record is made of the number of frames, in this case four frames, for which those values apply. The record made at block 56 is schematically illustrated at record 112 shown in FIG. 5. At block 58, the LEVEL is set to go down one level, which is illustrated by arrow 114 in FIG. 4 and open bracket 116 in FIG. 5. At block 60, the appropriate pixels are masked as is illustrated by the black portions of mask 118 shown in FIG. 4. At block 62, frames 100, 104, 106, 108 and 110 are designated as being AVAILABLE at this LEVEL.

Flow returns to block 32, at which point frame 100's red, green and blue pixel values are loaded in the high array 20 and the low array 22, but only for unmasked pixels. Flow proceeds from block 32 through block 34 to block 38, where frame 104 is designated the NEXT FRAME. Flow proceeds as described above, frame by frame, until frame 108 is designated the NEXT FRAME at block 48. From that point, flow proceeds through block 40 to block 42 where it is determined that frame 108 should be a new KEY FRAME at this level.

Accordingly, flow proceeds from block 42 through block 50 to block 56, where a record, shown at 120 in FIG. 5, is made. Flow proceeds to block 58, where the LEVEL is set to go down one level, represented by arrow 122 and open bracket 124. Additional pixels are masked at block 60, resulting in mask 126. At block 62, frames 100, 104, 106 and 108 are designated as being AVAILABLE at this LEVEL.

Flow then returns to block 32, as described above, through blocks 34, 38, 40 and 42, at which point the NEXT FRAME, frame 104, should be made a new KEY FRAME. As a result, flow proceeds from block 42 to block 50, where it is determined that for no pixel do the values in the high array differ from those in the low array by more than a threshold T2. As a result, flow proceeds from block 50 to block 52, where a record 128 is made. At block 54, frame 104 is made the new KEY FRAME, and flow proceeds back to block 32.

At block 32, frame 104's RGB values for the pixels representing the dot in the middle of the frame (the only unmasked pixels at this point) are loaded into both the high array 20 and the low array 22. Flow then proceeds through blocks 34, 38 and 40 to block 42, at which point it is determined that the NEXT FRAME, frame 106, should be made a new KEY FRAME. In that instance, all of frame 106's unmasked pixel values differ from frame 104's unmasked pixel values by more than a threshold T1. Flow proceeds from block 42 through block 50 to block 52, where record 130 is made. At block 54, frame 106 is made the new KEY FRAME, and flow returns back to block 32.

Flow proceeds from block 32 through blocks 34 and 38 to block 40, at which point it is determined that another frame is not AVAILABLE at this LEVEL after the NEXT FRAME, frame 108. As a result, flow proceeds from block 40 to block 64, where it is determined that the current LEVEL is not the top level. As a result, flow proceeds from block 64 through block 66 to block 68, where record 132 is made. From block 68 flow proceeds to block 70 where the pixels masked at this LEVEL are unmasked. The resulting masked pixels are again shown at mask 118 in FIG. 4. At block 72, the LEVEL is set to go up one level as represented by arrow 134 and close bracket 135. From block 72, flow proceeds to block 74 where a determination is made as to whether another frame is AVAILABLE at this LEVEL after the NEXT FRAME (in this instance, frame 108). Because frame 110 is AVAILABLE at this LEVEL, flow proceeds from block 74 to block 78 where frame 108 becomes the new KEY FRAME. From block 78 flow proceeds back to block 32, where the high array 20 and the low array 22 are loaded as described above. From block 32 flow proceeds through blocks 34 and 38 to block 40, where it is determined that no other frames are AVAILABLE at this LEVEL after the NEXT FRAME (frame 110). As a result, flow proceeds from block 40 through block 64, through block 66 to block 68 where record 136 is made. From block 68, flow proceeds to block 70, where the pixels which were masked at this level are unmasked. This results in no pixels being masked as illustrated by mask 102. At block 72, the LEVEL is set to go up one level, as represented by arrow 138 and close bracket 140.

At this point, the LEVEL is again at the top level. Flow proceeds from block 72 through block 74 to block 78 where frame 110 is made the new KEY FRAME. Flow proceeds from block 78 back to block 32 as described above. Flow proceeds from block 32 through blocks 34 and 36 to block 38, at which point frame 142 is designated the NEXT FRAME. Frame 142 is identical to frame 110. Flow proceeds from block 38 through block 40 to block 42, where it is determined that, clearly, frame 142 should not be made a new KEY FRAME. As a result, flow proceeds from block 42 through blocks 44 and 46 to block 48. Because frame 142 is identical frame 110, no changes are made to the high array or the low array at blocks 44 and 46. At block 48, frame 144 is designated as the new NEXT FRAME. Frame 144 is the same as frames 110 and 142, except that a large black dot is present in the center of the brown field. Flow proceeds from block 48 through block 40 to block 42, where it is determined that frame 144 should be made a new KEY FRAME. As a result, flow proceeds from block 42 through block 50 to block 52, where record 146 is made. At block 54 frame 144 is made the new KEY FRAME, and flow proceeds back to block 32.

From block 32, flow proceeds through blocks 34 and 36 to block 38, where frame 148 is designated the NEXT FRAME. Frame 148 is identical to frame 144. Flow proceeds from block 38 through block 40 to block 42, where it is determined that frame 148 should not be made a new KEY FRAME. Therefore, flow proceeds from block 42 through blocks 44 and 46, where no changes are made to the high array 20 and the low array 22, to block 48.

At block 48, frame 150 is designated as the NEXT FRAME. Frame 150 is the same as frame 148, except that the large black dot is replaced by a small black dot. From block 48, flow proceeds through block 40 to block 42 where, in this example, it is determined that frame 150 should not be made a new KEY FRAME. Flow proceeds from block 42 to block 44, where the high array 20 is updated. From block 44 flow proceeds to block 46 where no change need be made to the low array 22. From block 46 flow proceeds to block 48, where frame 152 is designated as the NEXT FRAME. Frame 152 is the same as frame 150, except that the top portion of the wide vertical black band is made brown. From block 48 flow proceeds through block 40 to block 42, where it is determined that frame 152 should not be made a new KEY FRAME. From block 42 flow proceeds to block 44, where the high array 20 is again updated. From block 44 flow proceeds through block 46 to block 48 where frame 154 is made the new NEXT FRAME. Frame 154 is the same as frame 152, except that the entire wide vertical band is made brown.

Flow proceeds from block 48 through block 40 to block 42, where it is determined that frame 154 should be made a new KEY FRAME. Flow proceeds from block 42 through block 50 to block 56 where record 156 is made. At block 58, the LEVEL is set to go down one level, represented by arrow 158 and open bracket 160. At block 60, the appropriate pixels are masked resulting in mask 162 shown in FIG. 4. At block 62, frames 144, 148, 150, 152 and 154 are designated as being AVAILABLE at this LEVEL. Flow proceeds from block 62 back to block 32.

From block 32, flow proceeds through blocks 34, 38 and 40 to block 42 where it is determined frame 148 should not be made a new KEY FRAME. Flow proceeds through blocks 44 and 46 to block 48 where frame 150 is designated the NEXT FRAME. Flow proceeds from block 48 through block 40 to block 42, where it is determined that frame 150 should be made a new KEY FRAME. As a result, flow proceeds from block 42 through block 50 to block 52 where record 164 is made. At block 54, frame 150 is made the new KEY FRAME, and flow proceeds back to block 32.

From block 32, flow proceeds through block 34 to block 38, where frame 152 is designated the NEXT FRAME. From block 38, flow proceeds through block 40 to block 42 where it is determined that frame 152 should not be made a new KEY FRAME. As a result, flow proceeds from block 42 through blocks 44 and 46 to block 48, where frame 154 is designated the NEXT FRAME. From block 48 flow proceeds to block 40 where it is determined that another frame is not AVAILABLE at this LEVEL after frame 154. As a result, flow proceeds from block 40 to block 64, where it is determined that current LEVEL is not the top level. As a result, flow proceeds from block 64 through block 50 to block 56 where record 166 is made. At block 58, the LEVEL is set to go down one level, designated by arrow 168 and open bracket 170. At block 60, the appropriate pixels are masked, resulting in mask 172 shown in FIG. 4. At block 62 frames 150, 152, and 154 are designated as being AVAILABLE at this LEVEL. Flow proceeds from block 62 back to block 32.

From block 32 flow proceeds through block 34 to block 38 where frame 152 is designated as the NEXT FRAME. From block 38 flow proceeds through block 40 to block 42 where it is determined that frame 152 should be made a new KEY FRAME. As a result, flow proceeds from block 42 through block 50 to block 52, where record 174 is made. At block 54, frame 152 is designated as the KEY FRAME, and flow proceeds back to block 32.

From block 32 flow proceeds through block 34 to block 38, where frame 154 is designated as the NEXT FRAME. From block 38 flow proceeds to block 40 where it is determined that there are no other frames AVAILABLE at this LEVEL after frame 154. Accordingly, flow proceeds from block 40 to block 64 where a determination is made as to whether the current LEVEL is the top level. Flow proceeds from block 64 through block 66 to block 68 where record 176 is made. At block 70 the pixels which were masked at this level are unmasked. At block 72, the LEVEL is set to go up one level, represented by arrow 177 and close bracket 178. At block 74 a determination is made as to whether another frame is AVAILABLE at this LEVEL after frame 154. In that frame 154 is the last frame AVAILABLE at this LEVEL, the first level below the top level, flow proceeds from block 74 to block 76. At block 76 a determination is made as to whether the current LEVEL is the top level. It is not the top level. Therefore, flow proceeds from block 76 back to block 70 where the pixels which were masked at this level are unmasked. At block 72 flow goes up one level, back to the top level in this instance. This is represented by arrow 179 and close bracket 181. From block 72, flow proceeds through block 74 to block 78, where frame 154 is designated as the KEY FRAME. From block 78, flow proceeds back to block 32.

From block 32 flow proceeds through blocks 34 and 36 to block 38, where frame 180 is designated as the NEXT FRAME. Frame 180 is the same as frame 154, except that a second small black dot is included. From block 38 flow proceeds through block 40 to block 42, where it is determined that frame 180 should not be made a new KEY FRAME. Flow proceeds from block 42 through blocks 44 and 46 to block 48. No change is made to the high array 20 at block 44, but the low array 22 is updated because of the second black dot appearing in frame 180. At block 48, frame 182 is designated as the NEXT FRAME. Frame 182 is identical to frame 180. Flow proceeds from block 48 to block 40 where it is determined that another frame is not AVAILABLE at this LEVEL after frame 182. As a result, flow proceeds from block 40 to block 64 where a determination is made as to whether the current LEVEL is the top level. In this case, the current LEVEL is the top level. Therefore, flow proceeds from block 64 through block 50 to block 56 where record 184 is made.

Next, at block 58, the LEVEL is set to go down one level, represented by arrow 186 and open bracket 188. At block 60, the appropriate pixels are masked, resulting in mask 190, shown in FIG. 4. At block 62, frames 154, 180 and 182 are designated as being AVAILABLE at this LEVEL. Flow proceeds from block 62 back to block 32. From block 32, flow proceeds through block 34 to block 38 where frame 180 is designated as the NEXT FRAME. From block 38, flow proceeds through block 40 to block 42, where it is determined that block 180 should be made a new KEY FRAME. As a result, flow proceeds from block 42 through block 50 to block 52 where record 192 is made. At block 54, frame 180 is designated as the new KEY FRAME, and flow proceeds back to block 32.

From block 32, flow proceeds through block 34 to block 38 where frame 182 is designated as the NEXT FRAME. From block 38, flow proceeds to block 40 where it is determined that no other frames are AVALIABLE at this LEVEL after frame 182. As a result, flow proceeds from block 40, through blocks 64 and 66, to block 68 where record 194 is made. At block 70, the pixels which were masked at this level are unmasked, and at block 72 the flow goes up one level, represented by arrow 196 and close bracket 198. At block 74, the determination is made as to whether another frame is AVAILABLE at this LEVEL after the NEXT FRAME. In this instance, frame 182 is the last frame at the top level. Therefore, flow proceeds from block 74 through block 76 to block 78, where frame 182 is designated as the new KEY FRAME. From block 78, flow proceeds to block 32 as described above. From block 32, flow proceeds through block 34 to block 36 where it is determined that no other frames are available at this level (the top level) after the KEY FRAME. As a result, flow proceeds from block 36 to block 37 where a record (not shown) is made of the KEY FRAME RGB values for one frame. The flow ends at this point.

The foregoing is a description of one embodiment of the method of noise reduction of the present invention. The various steps may be modified, expanded, added to, simplified or consolidated in many different ways without departing from the spirit and scope of the claimed invention.

What is claimed is:

1. A method for reducing noise in digital video information represented by a succession of video frames stored in a computer memory and displayable by a video system to convey the video information to a viewer, each frame including a plurality of pixels each pixel being characterized by an intensity value, said method comprising the steps of:

establishing a key frame and a next frame subsequent to said key frame in the succession of video frames;

comparing said next frame to said key frame to determine whether intensity values of more than a predetermined portion of the pixels of said next frame differ from intensity values of identically located pixels of said key frame by more than a first predetermined intensity threshold thereby satisfying a first condition and, if the first condition is not satisfied, repeating this step for subsequent next frames until the first condition is satisfied;

determining whether intensity values of identically located pixels of any two frames, for which the first condition was not satisfied in said comparing step, differ by more than a second predetermined intensity threshold thereby determining whether a second condition is satisfied is such pixel values differ by more than the second predetermined intensity threshold; and formatting for subsequent display a sequence of the frames, for which said first condition was not satisfied in said comparing step, by substituting those pixels of said key frame for which said second condition is not satisfied for identically located pixels of the frames of the succession of video frames for which said first condition was not satisfied in said comparing step.

2. The method of claim 1 further comprising the steps of repeating said comparing, determining and formatting steps only with respect to pixels of said key frame for which said second condition is satisfied.

3. A method for reducing noise in digital video information, represented by a succession of video frames stored in a computer memory and displayable to convey the stored information to a viewer, each frame including a plurality of pixels each pixel being characterized by an intensity value, said method comprising the steps of:

establishing a key frame and a next frame subsequent to said key frame in the succession of video frames;

comparing said next frame to said key frame to determine whether said next frame differs from said key frame by more than a predetermined quantity characterizing the frame thereby satisfying a first condition and, if said first condition is not satisfied, repeating this step for a subsequent next frame until said first condition is satisfied;

determining whether intensity values of identically located pixels of any two frame, for which said first condition was not satisfied in said comparing step, differ by more than a predetermined intensity threshold, thereby establishing a second condition which is satisfied if such pixel intensity values differ by more than the predetermined intensity threshold;

substituting those pixels of said key frame for which said second condition is not satisfied for identically located pixels of all the frames for which said first condition was not satisfied in said comparing step; and formatting and storing a record of those key frame pixels for which said second condition is not satisfied and the number of frames for which said first condition was not satisfied in said comparing step to enable subsequent display to a viewer of the video information represented by the frames for which said first condition was not satisfied.

4. A method for storage and transmission of digital video information represented by a sequence of video frames displayable to a viewer, comprising the steps of:

establishing a first key frame in the sequence;

locating a next key frame in the sequence by comparing the first key frame to each subsequent video frame in the sequence until the number of pixels of the first key frame that differ from identically located pixels of the compared frame is larger than a predetermined first intensity threshold, wherein a portion of the sequence, including the first key frame up to, but not including the next key frame, forms a first subsequence;

determining, for the frames of the first subsequence, pixel locations for which the values of any two identically located pixels in any two frames of the first sequence differ by less than a predetermined second intensity threshold; and storing in a new storage frame the pixel values of the first key frame for all the determined pixel locations in the determining step.

5. The method of claim 4 further comprising the step of formatting the first subsequence of frames for storage and transmission so that pixels of the new storage frame represent identically located pixels in each frame of the first subsequence of frames.

6. The method of claim 5 further comprising the steps of repeating said locating, determining, storing and formatting steps in the frames of the first subsequence only with respect to pixel locations which were not determined in the determining step.

7. The method of claim 6, wherein prior to the step of repeating, pixel locations of the first key frame which were not determined in the determining step are masked.

8. The method of claim 4, wherein said step of determining comprises the steps of;

providing a high frame storage array and a low frame storage array;

storing for each pixel location the largest pixel value of all identically located pixels in the frames of the first subsequence of frames into said high frame storage array;

storing for each pixel location the smallest pixel value of all identically located pixels in the frames of the first subsequence of frames into said low frame storage array;

for each pixel location comparing to the second predetermined threshold the difference between the values of identically located pixels in the high frame storage array and the low frame storage array.

9. The method of claim 8, wherein in the step of comparing the difference between the values of identically located pixels is the pythagorean distance between the compared pixel values.

10. A system for storage and transmission of digital video information represented by a sequence of video frames displayable to a viewer, comprising:

storage means for storing digital video information represented by the sequence of video frames;

means for establishing a first key frame in the sequence;

means for locating a next key frame in the sequence, said means for locating comprising means for comparing the first key frame to each subsequent video frame in the sequence until the number of pixels of the first key frame that differ from identically located pixels of the compared frame is larger than a predetermined first intensity threshold, wherein a portion of the sequence, including the first key frame up to, but not including the next key frame, forms a first subsequence;

means for determining, for the frames of the first subsequence, pixel locations for which the values of any two identically located pixels differ by less than a predetermined second intensity threshold;

means for storing in a new storage frame the pixel values of the first key frame for all the pixel locations determined by said means for determining;

means for formatting the first subsequence of frames so that pixels stored in the new storage frame represent identically located pixels in each frame of the first subsequence of frames; and display means to display to a viewer digital video information represented by the formatted sequence of video frames.

11. The system of claim 10 further comprising:

a high frame storage array and a low frame storage array;

means for storing for each pixel location the largest pixel value of all identically located pixels in the first subsequence of frames into said high frame storage array;

means for storing for each pixel location the smallest pixel value of all identically located pixels in the first subsequence of frames into said low frame storage array; and means for comparing to the second predetermined threshold of the difference between the values of identically located pixels in the high frame storage array and the low frame storage array.

* * * * *